US007222160B2

(12) United States Patent
Hlasny (10) Patent No.: US 7,222,160 B2
(45) Date of Patent: May 22, 2007

(54) OBJECT SEARCH AND RETRIEVAL SERVICE FOR AN AD HOC DATA COMMUNICATION SYSTEM

(75) Inventor: Daryl Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 656 days.

(21) Appl. No.: 09/910,650

(22) Filed: Jul. 20, 2001

(65) Prior Publication Data

US 2003/0018708 A1    Jan. 23, 2003

(51) Int. Cl.
    *G06F 15/16* (2006.01)
(52) U.S. Cl. ...................................... 709/217; 709/216
(58) Field of Classification Search ................ 709/203, 709/204, 216, 238, 206, 217; 707/3, 10; 455/517
    See application file for complete search history.

(56) References Cited

U.S. PATENT DOCUMENTS

| 5,379,424 | A | 1/1995 | Morimoto et al. |
|---|---|---|---|
| 5,649,205 | A | 7/1997 | Martins |
| 5,915,248 | A | 6/1999 | Kinoshita et al. |
| 5,924,087 | A | 7/1999 | Takahashi et al. |
| 5,946,677 | A | 8/1999 | Bullen |
| 6,029,165 | A | 2/2000 | Gable |
| 6,035,325 | A | 3/2000 | Potts, Jr. |
| 6,061,733 | A | 5/2000 | Bodin et al. |
| 6,067,560 | A | 5/2000 | Potts, Jr. |
| 6,366,907 | B1* | 4/2002 | Fanning et al. ................ 707/3 |
| 6,470,189 | B1* | 10/2002 | Hill et al. .................... 455/517 |
| 6,501,421 | B1* | 12/2002 | Dutta et al. ............ 342/357.13 |
| 6,651,053 | B1* | 11/2003 | Rothschild ...................... 707/3 |
| 2002/0065045 | A1* | 5/2002 | Kim ............................ 455/41 |
| 2002/0087632 | A1* | 7/2002 | Keskar ....................... 709/204 |
| 2002/0147771 | A1* | 10/2002 | Traversat et al. ........... 709/203 |
| 2002/0147810 | A1* | 10/2002 | Traversat et al. ........... 709/224 |
| 2002/0188735 | A1* | 12/2002 | Needham et al. ........... 709/229 |
| 2003/0050959 | A1* | 3/2003 | Faybishenko et al. ...... 709/202 |
| 2005/0240665 | A1* | 10/2005 | Gu et al. .................... 709/220 |

OTHER PUBLICATIONS

Hpertext Transfer Protocol —HTTP/1.1, http://www.w3.org/Protocols/HTTP/1.1/rfc2616.pdf, R. Fielding et al.; The Internet Society, Jun. 1999, pp. 21.*
Kazaa Media Desktop. Intelligent Downloads [online]. Kazaa, 2000 [retrieved on Sep. 21, 2004]. Retrieved from the Internet: <URL:http://web.archive.org/web/20001201223800/www.kazaa.com/index.php?page=technology>.*
Bluetooth Specification, Version 1.1; pp. 379; Feb. 22, 2001.*
Kawaguchi et al. "Ad Hoc Network System based on Infrared Communication". ICPP Workshop. p. 114-119. 1999. <citeseer.ist.psu.edu/kawaguchi99ad.html>.*

(Continued)

*Primary Examiner*—Rupal Dharia
*Assistant Examiner*—Philip Chea
(74) *Attorney, Agent, or Firm*—Chernoff, Vilhauer, McClung & Stenzel (57) ABSTRACT

A method of locating and retrieving data objects on an ad hoc data communication system includes discovering devices comprising the system, identification of discovered devices supporting location and transfer of objects from remote devices, locating a desired data object on the devices of the system, and transferring of the desired object to a destination device.

9 Claims, 7 Drawing Sheets

OTHER PUBLICATIONS

Megowan et al., IrDA Object Exchange Protocol, IrOBEX, Mar. 18, 1999, Version 1.2, Counterpoint Systems Foundry, Inc., Microsoft Corporation.

Leach et al., UUIDs and GUIDs, Internet Draft, Feb. 4, 1998.

Bluetooth Specification, Version 1.1, Part K:12, File Transfer Protocol, Bluetooth Special Interest Group, Feb. 22, 2001.

* cited by examiner

OBJECT SEARCH AND RETRIEVAL SERVICE FOR AN AD HOC DATA COMMUNICATION SYSTEM

CROSS-REFERENCE TO RELATED APPLICATIONS

Not applicable.

BACKGROUND OF THE INVENTION

The present invention relates to data communication systems and, more particularly, to a method for locating and retrieving data objects with an ad hoc data communication system.

Bluetooth is one of several specifications for short and medium range wireless communication systems. Bluetooth radio communication occurs at 2.4 GHz in the unlicensed Instrument, Scientific, and Medical (ISM) frequency band and utilizes frequency hopping to reduce interference and fading. The Bluetooth communication channel can support both data (asynchronous) and voice (synchronous) communications with a bandwidth of 1 Mbps. Bluetooth is intended to provide an interface for almost all types of digital electronic devices and to facilitate a universal bridge to existing data processing networks, such as the Internet.

Bluetooth is intended to permit compatible devices located within range of the radio transceiver to make a wireless connection with minimal direct action by a user. Bluetooth devices can interact with each other in several ways. The simplest scheme involves a point-to-point interaction of two devices where one acts as the master for synchronization purposes and the other as a slave in a network known as a piconet. The Bluetooth specification permits a piconet to include as many as seven active slave devices communicating in a point-to-multipoint topology over the communication channel shared by all of the devices. Two or more independent piconets can combine to form a nonsynchronized network known as a scatternet when a master or slave device of one piconet acts as a slave of the second piconet. The networks envisioned by the Bluetooth specification and other similar wireless communication systems are dynamic, ad hoc networks where clusters of data processing devices spontaneously form connections with each other for the purpose of communicating. Ad hoc networks are commonly characterized by the lack of a central access point or server and by dynamic and random entry and exit of network devices.

File or object transfer between devices is a defining function of a data communication network. The BLUETOOTH SPECIFICATION, Version 1.1, Bluetooth Special Interest Group, includes a FILE TRANSFER PROTOCOL, Part K:12, defining the application requirements for file transfers by interoperable Bluetooth devices. The profile defines protocols and procedures to support sharing, browsing and manipulating objects stored on remote devices and transferring objects between devices. However, a device user must manually set up the system and browse the shared objects of each connected device to locate a file or other object of interest. Further, if an object is transferred, the entire object must be transferred in a single session. These are substantial limitations for ad hoc networks of portable devices that may randomly move out of communication range.

Object search and retrieval services are also elements of wired data processing networks. One example is provided by Napstere® Internet information services where a central data base of remotely located user files is maintained for object searching. After locating a desired file by searching the data base, the file may be copied to a networked data processing device by peer to peer communication with the remote device on which the file is located. However, this type of service requires a server which is not available in an ad hoc network of temporarily connected devices and the network must be manually configured to facilitate the object transfer.

A second file location and retrieval protocol available on the Internet defines communication within a peer network or mesh of servants having attributes of a client and a server. Each servant is only aware of servants that are connected to it. Object search requests received by a servant are propagated through the network by passing the request on to all other servants connected to the receiver of the search request. File transfers are made peer to peer by remote devices. While this methodology eliminates the requirement of a central server, the network must be set up before the protocol can be used, limiting its usefulness in conjunction with dynamic ad hoc networks.

What is desired, therefore, is a method, requiring minimal user intervention, to locate and transfer data objects with a dynamic, ad hoc data processing system.

DETAILED DESCRIPTION OF THE INVENTION

The BLUETOOTH SPECIFICATION, Version 1.1, developed by the Bluetooth Special Interest Group defines a short range and an optional medium range radio link capable of voice and data communications. Objectives of the Bluetooth system include providing an interface between virtually all types of digital electronic devices and facilitating a universal bridge to existing data processing networks, such as the Internet. Bluetooth is one example of a number of systems being developed to provide wireless communication between electronic device and while the operation of an exemplary Bluetooth system is utilized in describing the present invention, the invention may be utilized with other data communication systems even though those systems may utilize methods, procedures, and components differing from those characterizing a Bluetooth system.

The Bluetooth radio transceiver operates in the unlicensed Instrument, Scientific, and Medical (ISM) frequency band between 2.4 and 2.48 GHz. The Bluetooth transceiver utilizes a frequency hopping, spread spectrum, half-duplex signal. For interference resistance, the signal hops through 79 frequencies, in 1 MHz intervals, at up to 1600 hops/sec. Bluetooth and similar systems utilize small ad hoc networks comprising clusters of data processing devices that connect with each other to facilitate voice and data communication.

Figure 1:
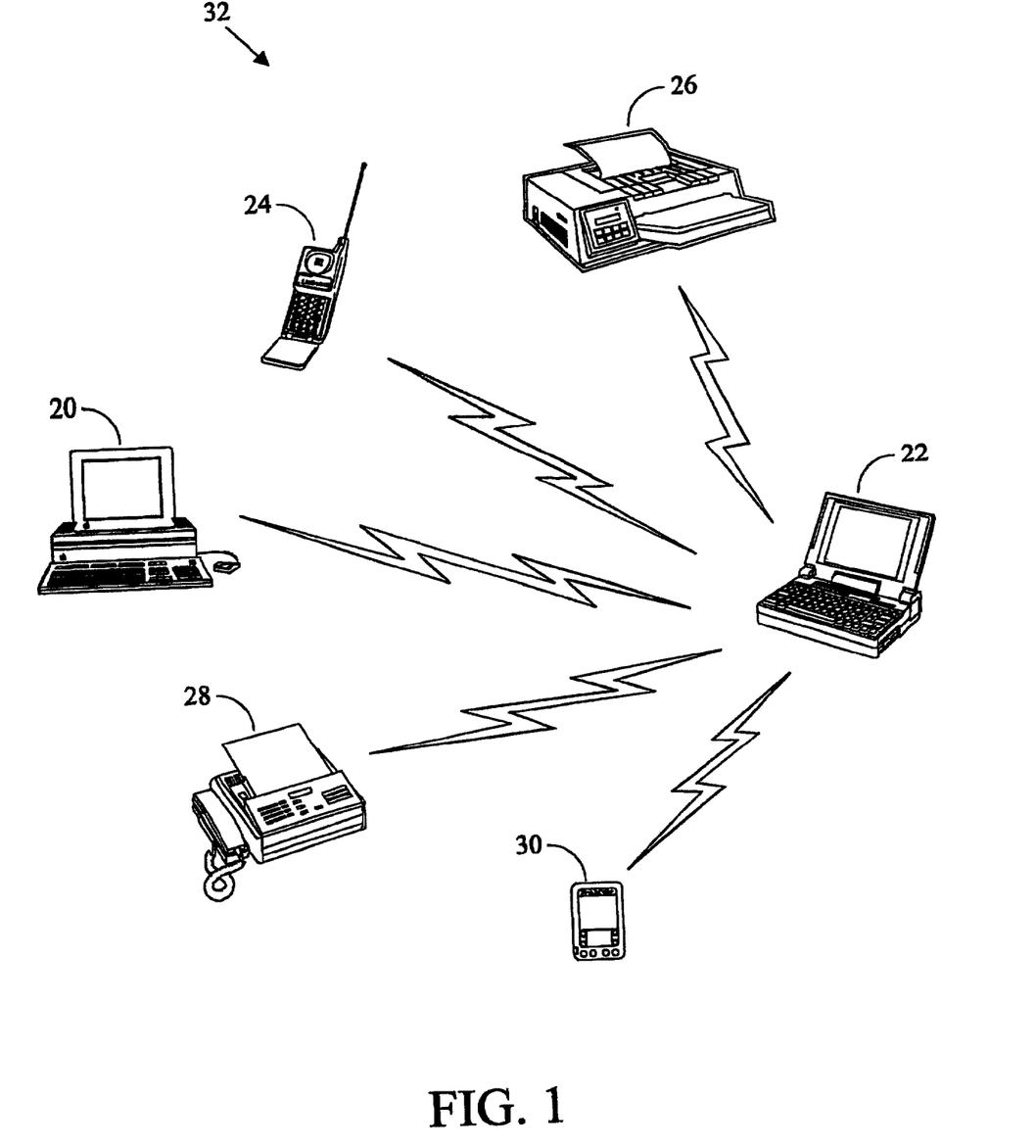
FIG. 1 is a schematic representation of an ad hoc network of data processing devices.
Figure 2:
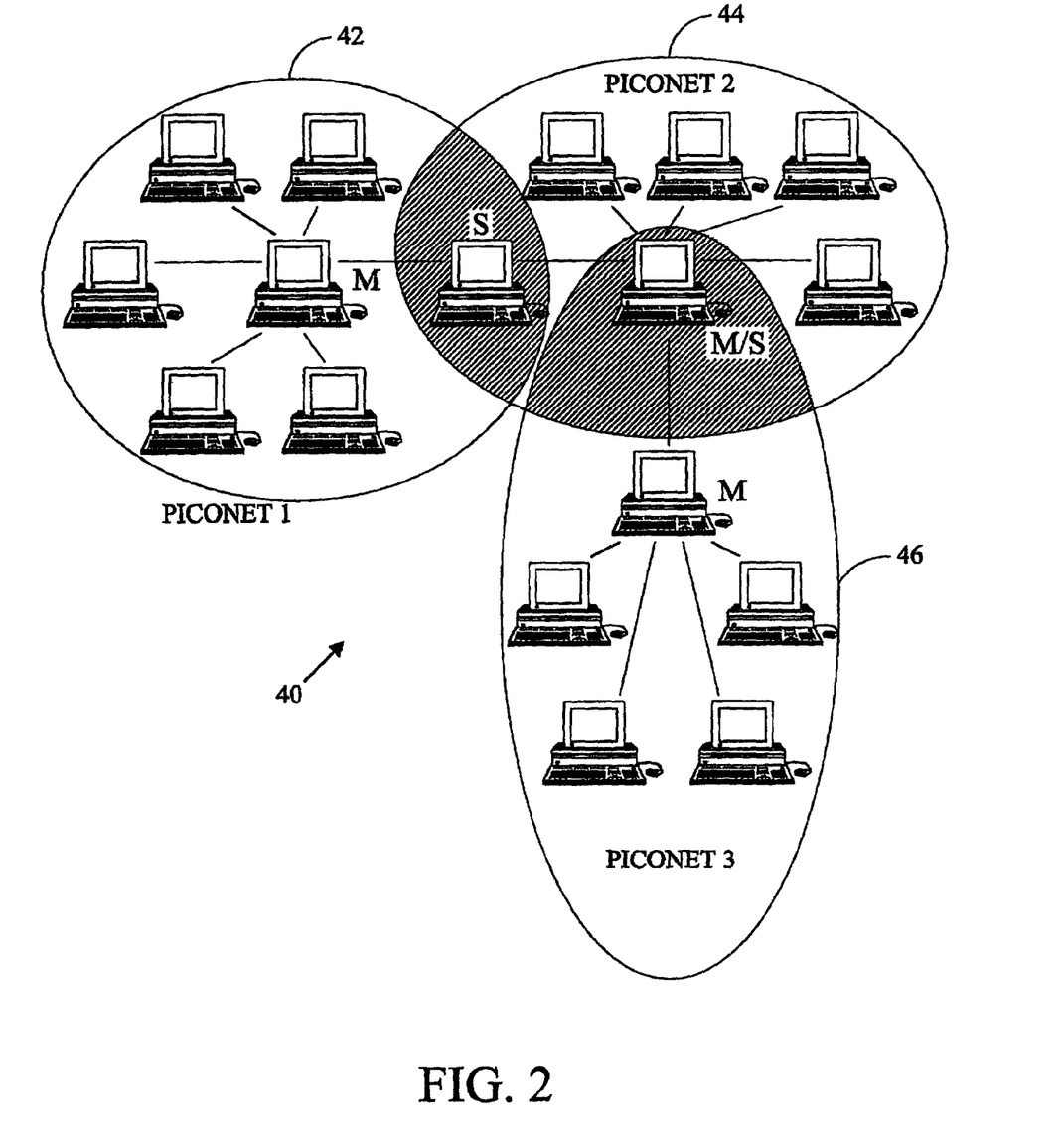
FIG. 2 is a schematic representation of a Bluetooth scatternet comprising a plurality of ad hoc networks of data processing devices.

Bluetooth compatible devices that come within radio range of each other can spontaneously establish communications with minimal direct action by a user. Referring to FIG. 1, two or more Bluetooth devices, such as a desktop computer 20, a portable computer 22, a cellular telephone 24, a printer 26, a facsimile machine 28 and personal digital assistant (PDA) 30, sharing a communication channel form a network known as a piconet 32. A piconet can include up to eight active devices with all devices sharing a communication channel with a common frequency hopping pattern. While all Bluetooth devices are peer units, when a piconet 32 is established one device will act as a master 22, providing the clock and frequency hopping pattern that regulates traffic in the communication channel and synchronizes the other devices of the piconet. The remaining devices participating in a Bluetooth piconet 32 are designated as slave units, indicating their reliance on the master for network synchronization. Referring to FIG. 2, two or more piconets 42, 44, and 46 can be established and linked together in a non-synchronized, ad hoc scatternet 40 to provide even greater network configuration flexibility. Either a slave or a master of one of the participating piconets can establish the scatternet connection by becoming a slave in another piconet.

Figure 3A:
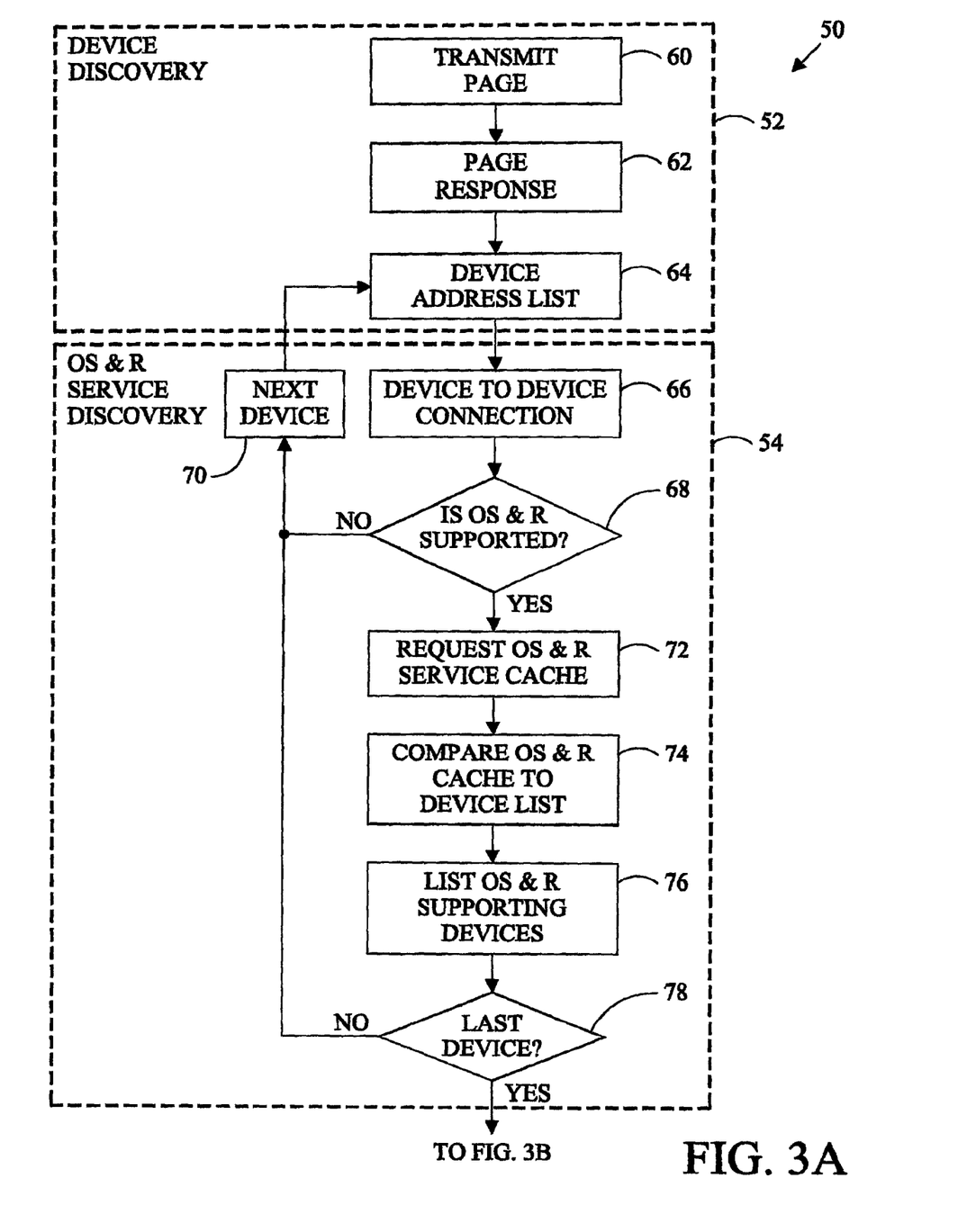
FIG. 3A is a flow diagram for the object search and retrieval method of the present invention.
Figure 3B:
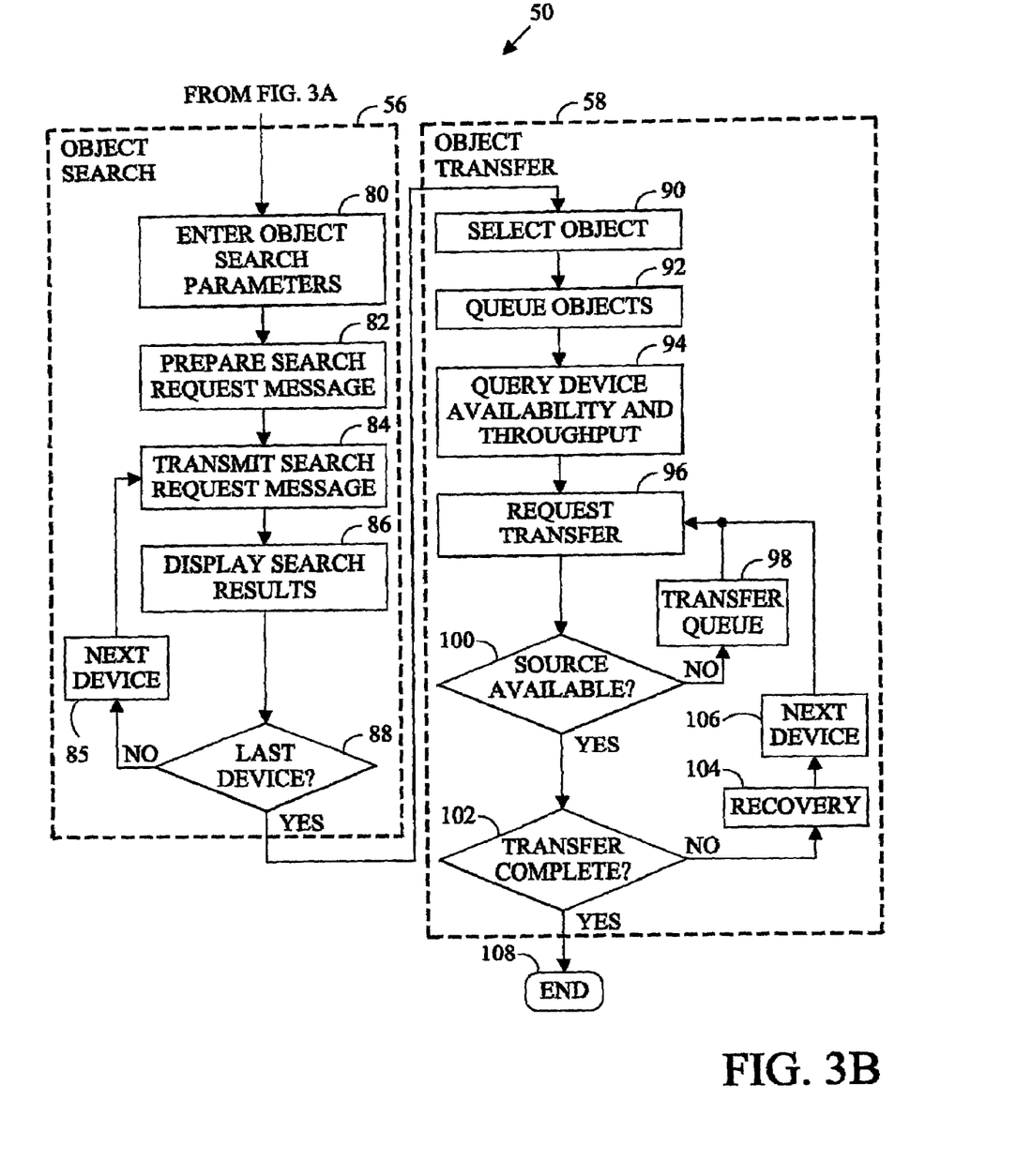
FIG. 3B is a continuation of the flow diagram FIG. 3A for the object search and retrieval method of the present invention.

A defining operation of a data communication network is the transferring of a file or other data object (data that can be independently selected and manipulated) from a source device to a destination device. For example, the participants in a conference may desire to share a file containing a paper or a group of presentation slides. In addition, it is highly desirable that the devices of an ad hoc data processing network transfer objects with a minimum of user interaction because the network configuration is typically dynamic. Network set up requires skills many users may not possess and users are likely to be frustrated when, after setting up the network for an object transfer, the transfer is interrupted when one of the portable devices moves out of range. For example, a Bluetooth network might be used to automatically update a scheduling utility on a user's personal digital assistant (PDA) or portable telephone when the device comes in range of the user's desktop or portable computer. The present inventor concluded that methods of transferring data objects with wired networks are generally not well suited to ad hoc systems comprising mobile devices that randomly and spontaneously join and leave the network. Referring to FIGS. 3A and 3B, the inventor further concluded that an object transfer method 50 for an ad hoc system should facilitate discovering the devices comprising the system 52, identification of discovered devices that support a service facilitating locating and transferring objects from a remote device (object search and retrieval service (OS & R)) 54, searching the available devices for a desired data object 56, and transferring the object piecemeal to a destination device 58 with a minimum of direct involvement by a user.

Referring to FIG. 3A, the device discovery phase 52 of the method of the present invention is initiated when a paging message is transmitted 60 by an initiating communication device. Devices that are within range of the initiator will receive the paging message and respond to the page 62 with the responder's device address. The responses are collected and the addresses of responding devices are compiled in a device list 64.

Figure 4A:
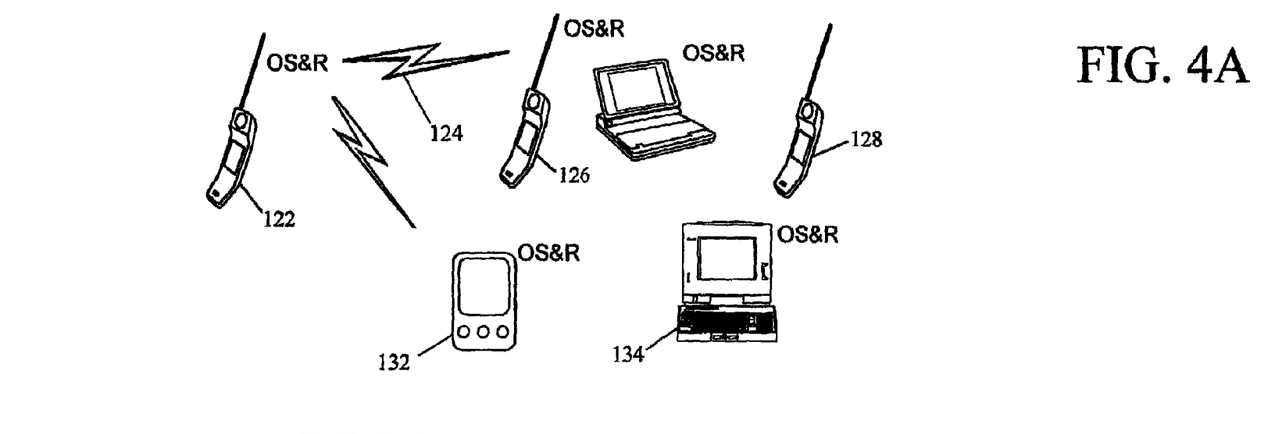
FIG. 4A is a pictorial representation of an object search and retrieval service discovery phase of the object search and retrieval method of the present invention.

Following device discovery 52, the method searches the devices included in the device list for devices that support the object search and retrieval (OS & R) service 54. Referring to FIG. 4A, the master 122 connects point to point 124 to the first device 126 listed in the discovered device list 66 and queries that device concerning its support for the OS & R service 68. If the device does not support the service (for example device 128), the master will connect to the next device on the device list 70. If the slave does support the object search and retrieval service, the master will request the object search and retrieval service cache information from the slave 72. Each device supporting the OS & R service maintains an OS & R service cache listing addresses of other devices known to the device to support the object search and retrieval service. The entries in the service cache are compared to the addresses in the device list 74 and matching addresses are added to the list of devices supporting the object search and retrieval service 76 without the need for a specific service query directed to that device.

Figure 4B:
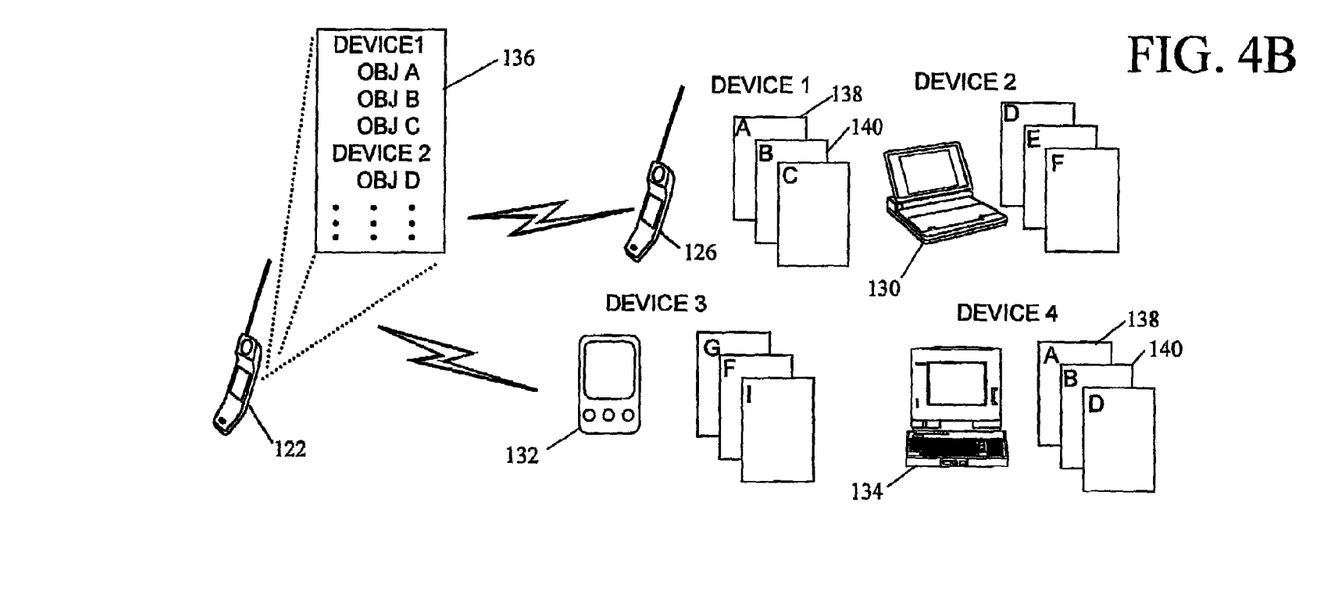
FIG. 4B is a pictorial representation of an object search phase of the object search and retrieval method.

When the level of support for the OS & R service has been determined for all the devices on the device list 78, either by direct query 68 or by inclusion in the service cache of one of the slaves 72, the master begins searching the supporting devices for an object of interest 56 as illustrated pictorially in FIG. 4B. The objective of the object search 56 is to determine an object identifier and a location of a file or other data object of interest to the user. To initiate an object search 56, the user enters search parameters 80 relating to an object or subject of interest. Search parameters may comprise an object name, object type, keyword, network community specific parameters, or other parameters that will permit the method to locate a data object that is stored on a remote device and that may be of interest to the user. Network community search parameters include object type or other object indicia utilized by a group of users having a common goal in object sharing. For example, artist name and track number might be used by a community sharing music files to identify the files. A search request message is created from the search parameters entered by the user 82 and is transmitted 84 to slaves 126, 130, 132, and 134 on the list of devices supporting the object search and retrieval service 76. Responses received from slaves are displayed to the user 86.

Figure 4C:
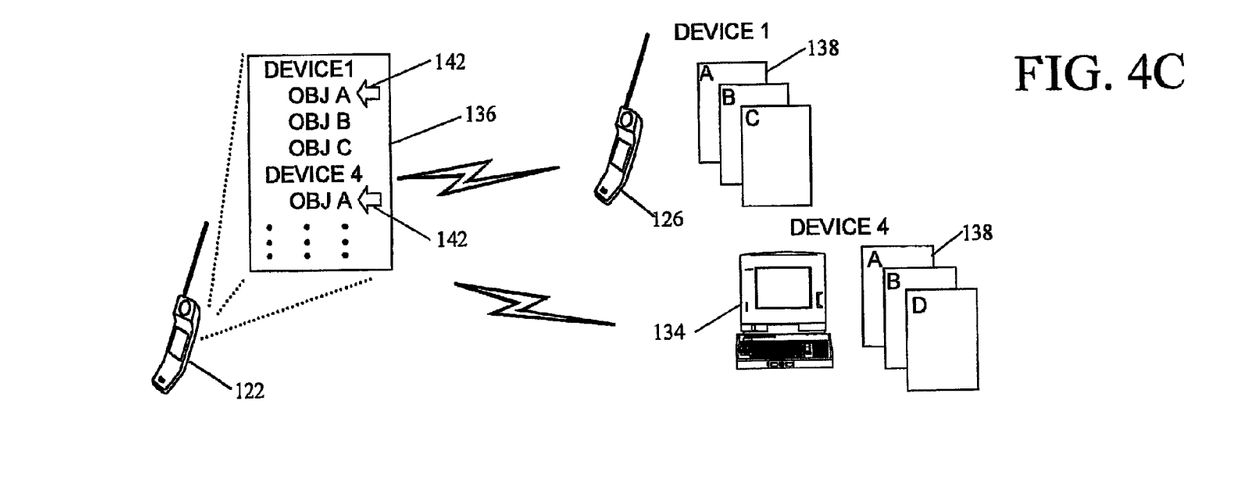
FIG. 4C is a pictorial representation of an object identification activity of the object search and retrieval method.

Typically, the response list 136 includes the one or more identifiers for the objects having a relationship to the search parameters and their locations as illustrated in FIG. 4C. The object identifiers typically include a name of the object (for examples, object A 138 and object B 140) and a Universal Unique Identifier (UUID). A UUID is a 128 bit number including a hardware address, time stamp, and random seed that is generated when the object is created and changes only when the object is altered. The UUID uniquely and universally identifies an object even though the object may be copied onto a number of data processing devices.

Figure 5:
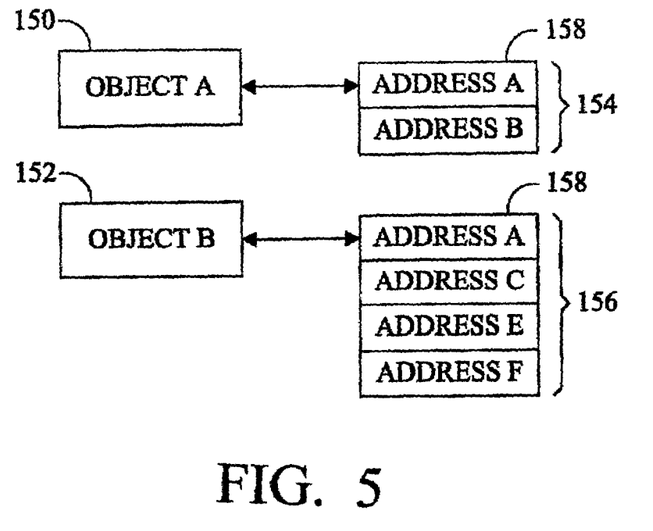
FIG. 5 is a schematic illustration of an alternative source list maintained in association with a data object.

Referring to FIG. 5, in the present invention, the object identification includes a list of alternate sources of the object 154 and 156 (indicated by brackets) that is maintained as part of the identification of the object 150 and 152, respectively. Each time the object 150 is copied to another device, the alternate source list 154 is inherited from the source of the object and the device address of the destination is added to the alternate source list 150. The alternative source list 154 is returned to the master by the slave in the response to the search request message and, if a device is included in the list of devices supporting OS & R, the address of an alternative source is displayed with the search results 86.

The search request message is sent sequentially 85 to each slave on the list of devices supporting the object search and retrieval service 84 until either the user stops the search or all devices have been queried 88.

Figure 4D:
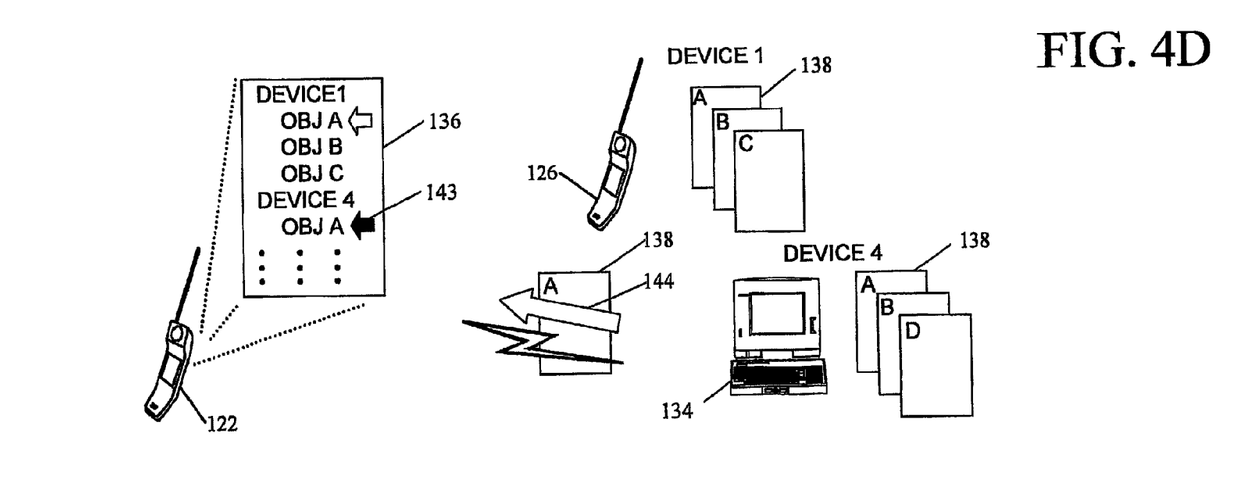
FIG. 4D is a pictorial representation of an object transfer activity of the object search and retrieval method.

To initiate the object transfer 58, the user can select an object 143 and its location from the list of responses 136 as illustrated pictorially in FIG. 4D or configure the device to automatically select one or more objects meeting the search criteria 90. For example, to automatically update a scheduling utility, the user can preselect a particular data file by name or UUID so that the file transfer can proceed without further manual identification of the file. The user selections are added to a download queue that is ordered according to preferences set by the user 92.

Following selection and queuing of the objects for downloading, one of the devices at which the object is located is selected as the source of the object download. Each potential source of the object is queried concerning a measure of the availability and capacity of the device for downloading, typically including the download throughput of the potential source 94. Typically, the downloading queue is annotated to include a ranking of potential sources according to download throughput, device availability, and the portion of the object that is available at that device. The user of a device may limit the object transfer capacity of a potential download source to preserve the device's facilities for other purposes by setting preference parameters related to the different applications in use on the device. Alternatively, the user may limit the number of simultaneous object transfers or allocate the available bandwidth among simultaneous transfer operations. The user of the destination device can select a source of the download or set preferences to allow the system to select a download source optimizing the measures of downloading performance. If none of the potential sources of the object have current download capability 100, the transfer is placed in a transfer queue until a source becomes available 98.

As illustrated pictorially in FIG. 4D, following identification of a download source for the object 143, the transfer is requested 96 and initiated when a source is available 100. The transfer 144 proceeds until completion 102 ending the object transfer 108 or until interruption. The transfer may be interrupted if the source moves out of range, a user stops or pauses the transfer, only part of the object is available from the selected source, or for other reasons related to the dynamic, ad hoc nature of the connection or the condition of the communication channel.

Figure 6:
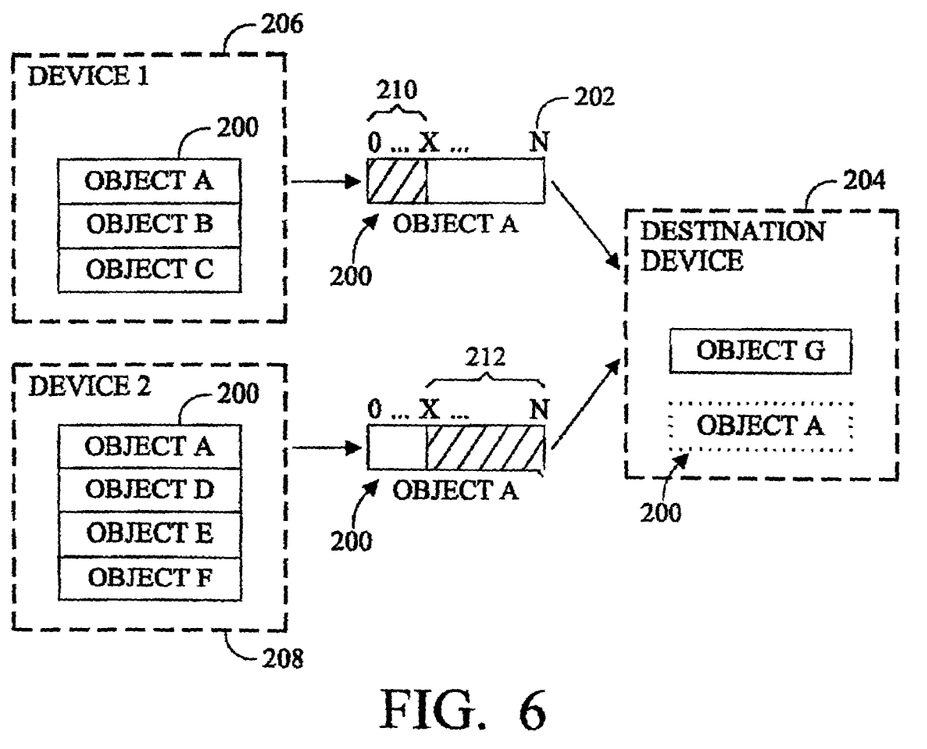
FIG. 6 is a schematic illustration of a partial transfer of a data from a plurality of sources.

Referring to FIG. 6, in the present invention, a data object 200 comprises an ordered sequence of bytes (0–N) 202 and the size of the object (sum of the bytes) is known to all devices that have any portion of the object, for example device "1" 206 and device "2" 208. When object data is received, the destination device 204 indexes the data to identify the portion of the object that has been received. As a result preserving the identify of bytes indicating the portion of the total data that has been received, the destination device can determine the identity of the portion not received and request the object from multiple sources each having only a part of the object (for example bytes 0–X 210 or bytes X–N 212 (indicated by brackets). Likewise, the destination device (master) can request a remaining portion of the data for the object from the same or another source if a transfer is interrupted before completion. This permits the user to pause and restart the transfer and permits the destination device to recover from failed transfers. In a network of portable devices operating in an inherently noisy communication environment, a transfer from one source can be interrupted by the source moving out of range or by interference.

If the transfer is interrupted before completion, the destination device may, subject to user election, initiate recovery to complete the transfer 104. If the list of available devices supporting the object search and retrieval service includes more than one potential source of the object, the recovery process can index to the next available device 106 and request the transfer of the remainder of the object 96. However, the recovery process 104 can combine device discovery, source selection, and object transfer as needed to locate a new source of the missing portion of the object.

The present invention provides a highly automated, self-initiating data transfer method that is suited to use with dynamic, ad hoc networks of portable devices. The method includes automated techniques for identifying devices in a dynamic, ad hoc system and for determining which devices support object location and transfer from remote devices. Files and other objects are located and the device having the maximum download capability is identified for the user by searching networked devices supporting the OS & R service. Portions of a file can be transferred from several sources and if a transfer is interrupted, the system can recover and download the remaining part of the file from another source.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of transferring an object from a source device to a destination device over an ad hoc network comprising at least one piconet, said method comprising the steps of:
    (a) transmitting a page message on a communication channel of said ad hoc network, wherein said ad hoc network is free from including a central server;
    (b) including an address of a device responding to said page message in a device list;
    (c) transmitting an object search and transfer service query to a device identified in said device list;
    (d) including an address of a data processing device responding to said object search and transfer service query in a list of devices facilitating a search and transfer of a data object;
    (e) transmitting a search request including a user specified search parameter to a data processing device identified in said list of devices facilitating a search for and transfer of a data object, said identified data processing device capable of searching for said object on responding said devices over a communication channel of said ad hoc network;
    (f) receiving a response to said search request from a data processing device identifying a data object having a relation to said search parameter;
    (g) transmitting a transfer availability query to a device that is a location of said object identified by a user;

(h) receiving a response to said transfer query including a measure of availability of a device to transfer said object, said measure of availability comprising a measure of data transfer throughput;

(i) selecting as said source device a responding device maximizing said measure of availability;

(j) transmitting to said source device a request to transfer said object; and (k) receiving said destination device data of said object transferred over said communication channel.

2. The method of claim 1 further comprising the step of displaying to a user an object identifier of said data object identified in said response to said search request.

3. The method of claim 1 wherein said response to said search request comprises an object name associated with a data object having a relation to said search parameter.

4. The method of claim 1 wherein said response to said search request includes a unique object identifier associated with a data object having a relation to said parameter.

5. The method of claim 1 wherein said response to said search request comprises an address of another device on which said data object is located.

6. The method of claim 1 wherein the step of receiving at said destination device data of said object transferred over said communication channel comprises the steps of:

(a) receiving a portion of said data of said object and an identifier of said portion of said data; and (b) preserving said identifier of said portion of said data.

7. The method of claim 1 further comprising the steps of:

(a) identifying a portion of said object not transferred to said destination device from said source device;

(b) identifying another source device having another portion of said object that has not been transferred to said destination device; and (c) requesting transfer of said another portion of said object from said another source device to said destination device.

8. The method of claim 7 wherein the step of identifying a portion of said object not transferred to said destination device from said source device comprises the steps of:

(a) including with data of said object a measure of quantity of data comprising said object; and (b) comparing a measure of said data received by said destination device to said measure of said quantity of data comprising said object.

9. The method of claim 8 wherein the step of including with data of said object a measure of quantity of data comprising said object comprises the step of including with an object a total number of bytes of data for an object comprises an ordered sequence of said bytes of data.

* * * * *